(12) United States Patent
James et al.

(10) Patent No.: US 9,882,847 B1
(45) Date of Patent: Jan. 30, 2018

(54) MULTIPLE MEDIUM SOCIAL NETWORKING EXPERIENCE

(75) Inventors: Laurence Anthony James, Oakland, CA (US); Arpan Mukherjee, West Bengal (IN)

(73) Assignee: GOOGLE LLC., Mountain View, CA (US)

( * ) Notice: Subject to any disclaimer, the term of this patent is extended or adjusted under 35 U.S.C. 154(b) by 1364 days.

(21) Appl. No.: 13/371,315

(22) Filed: Feb. 10, 2012

(51) Int. Cl.
*H04L 12/58* (2006.01)
*H04L 29/08* (2006.01)

(52) U.S. Cl.
CPC .............. *H04L 51/06* (2013.01); *H04L 51/18* (2013.01); *H04L 51/32* (2013.01); *H04L 51/36* (2013.01); *H04L 67/12* (2013.01)

(58) Field of Classification Search
CPC ....... G06Q 50/01; H04L 12/588; H04L 51/06; H04L 51/12; H04L 51/18; H04L 51/32; H04L 51/36; H04L 67/12
See application file for complete search history.

(56) References Cited

U.S. PATENT DOCUMENTS

| | | | | |
|---|---|---|---|---|
| 7,945,634 | B1 * | 5/2011 | Huda | 709/206 |
| 8,989,713 | B2 * | 3/2015 | Doulton | 455/414.1 |
| 9,576,270 | B1 * | 2/2017 | Afshar | H04L 51/32 |
| 2008/0040437 | A1 | 2/2008 | Agarwal et al. | |
| 2010/0179998 | A1 | 7/2010 | Matteini et al. | |
| 2011/0055335 | A1 | 3/2011 | Reilly et al. | |
| 2011/0055340 | A1 | 3/2011 | Bautista | |
| 2011/0092187 | A1 * | 4/2011 | Miller | H04L 12/1818 455/412.1 |
| 2011/0112899 | A1 * | 5/2011 | Strutton | G06Q 30/02 705/14.41 |
| 2011/0135071 | A1 * | 6/2011 | Milstein | 379/88.14 |
| 2011/0251970 | A1 * | 10/2011 | Oien | H04L 67/04 705/319 |
| 2011/0291863 | A1 * | 12/2011 | Ozaki | G01C 21/3682 340/995.14 |
| 2011/0314101 | A1 * | 12/2011 | Redmon | G06Q 10/10 709/204 |
| 2012/0233267 | A1 * | 9/2012 | Miner | H04L 51/14 709/206 |

(Continued)

OTHER PUBLICATIONS

Isaac, "Facebook's New Messaging App Aims to Do Away With SMS," Search Engine Watch, retrieved from http://www.wired.com/epicenter/2011/08/facebooks-messaging-app-sms/, Aug. 9, 2011, 9 pgs.

*Primary Examiner* — Patrice Winder
(74) *Attorney, Agent, or Firm* — McDermott Will & Emery LLP

(57) ABSTRACT

A system and machine-implemented method for providing a multiple medium social networking experience, the method comprising receiving a message from a user through a communication medium to perform an operation at a social networking site, determining if the message format used by the communication medium is compatible with the social networking site and generating a message in a format supported by the social networking site in response to determining that the communication medium is not compatible with the social networking site, the message including a command executable by the social networking site to perform the operation at the social networking site on behalf of the user.

19 Claims, 4 Drawing Sheets

(56) References Cited

U.S. PATENT DOCUMENTS

| | | | |
|---|---|---|---|
| 2012/0240062 A1* | 9/2012 | Passmore | H04L 51/32 |
| | | | 715/758 |
| 2012/0316948 A1* | 12/2012 | Shipley et al. | 705/14.23 |
| 2013/0014258 A1* | 1/2013 | Williams | 726/24 |
| 2013/0086163 A1* | 4/2013 | Neff | G06Q 10/10 |
| | | | 709/204 |
| 2013/0165086 A1* | 6/2013 | Doulton | 455/414.4 |
| 2014/0180788 A1* | 6/2014 | George | G06Q 30/0269 |
| | | | 705/14.41 |

\* cited by examiner

MULTIPLE MEDIUM SOCIAL NETWORKING EXPERIENCE

BACKGROUND

The subject disclosure generally relates to social networking, and, in particular, to a multiple medium social networking experience.

Communication through mobile devices and the computer is possible through various communication mediums such as phone, text-messaging services, e-mail services and social networking applications. However, communication and/or operations carried over each communication medium are separate from other communication carried through a different communication medium. For example, social Networking operations and communication may be limited to operations originated and carried out at a social networking client. Thus, where use of the social networking application is limited, for example due to internet connectivity being limited or unavailable, or having a device without full browsing capability, users may not be able to carryout a social networking experience.

Thus, a system facilitating a device independent multiple medium social networking experience using various internet based and non-internet based communication mediums may be desirable.

SUMMARY

The disclosed subject matter relates to a machine-implemented method for providing a multiple medium social networking experience, the method comprising receiving a message from a user through a communication medium to perform an operation at a social networking site. The method further comprising determining if the message format used by the communication medium is compatible with the social networking site and generating a message in a format supported by the social networking site in response to determining that the communication medium is not compatible with the social networking site, the message including a command executable by the social networking site to perform the operation at the social networking site on behalf of the user.

The disclosed subject matter also relates to a system providing a multiple medium social networking experience, the system comprising one or more processors and a machine-readable medium comprising instructions stored therein, which when executed by the processors, cause the processors to perform operations comprising receiving a message through a communication medium to perform an operation at a social networking site, the message including an indication of an operation to be performed at the social networking site and further including one or more parameters. The operations further comprising determining whether the message is in a format that is supported by the social networking site and generating a message in response to determining that the message is in a format that is not supported by the social networking site, the message including a command executable by the social networking site to perform the operation according to the one or more parameters at the social networking site on behalf of the user initiating the message.

The disclosed subject matter also relates to a machine-readable medium comprising instructions stored therein, which when executed by a machine, cause the machine to perform operations comprising receiving a message through a communication medium to perform an operation at a social networking site, the message including an identifier of a user initiating the message and an operation to be performed at the social networking site. The operations further comprising identifying the operation and one or more parameters associated with the operation in response to determining that the communication medium is not compatible with the social networking site. The operations further comprising generating a message including a command executable by the social networking site to perform the operation at the social networking site on behalf of the user initiating the message and providing the command for execution at the social networking site.

The disclosed subject matter further relates to machine-implemented method for providing a multiple medium social networking experience to a user, the method comprising receiving a message from a user device associated with a user to perform an operation at a social networking site, the message including an operation code representing the requested operation and one or more parameters providing one or more data value regarding the operation, wherein the message is received through a communication medium using a different message format than a message format used for directly sending messages to the social networking site and generating a second message in a format supported by the social networking site, the second message including an API call corresponding to the operation executable by the social networking site to perform the operation according to the one or more parameters at the social networking site on behalf of the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
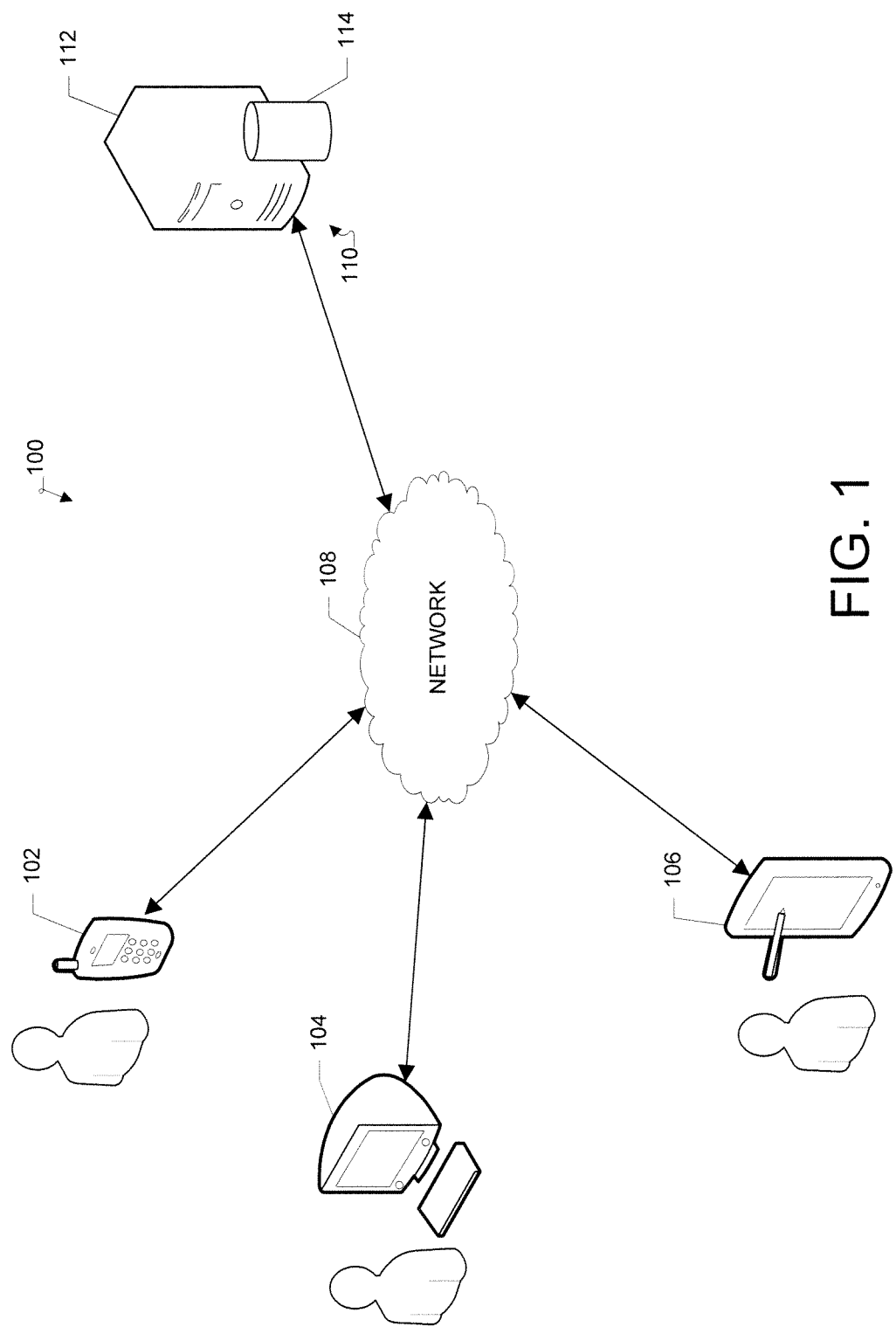
FIG. 1 illustrates an example client-server network environment which provides for a multiple medium social networking experience.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The terms "communication medium" and "medium" are used interchangeably throughout this application and refer to any medium allowing communication between users, and may include communication mediums allowing communication over electronic channels including but not limited to electronic messaging, text messaging, phone services, social networking applications or other software client applications facilitating communication between users. Communication through each communication medium may include transmitting content from a first communication device in a specific message format over the specific communication medium to a second device. The subject disclosure provides for a multiple medium social networking experience in a social networking environment between users associated at the one or more social networking sites. A system and method are provided for originating a social networking communication from one of a multiple communication mediums available to users, wherein the users may communicate through different communication mediums and carryout a social networking experience independent of the type of communication medium service or software used by the users. In addition to each user being able to use a different communication medium than the social networking application, the user may switch between communication mediums throughout the social networking experience.

Users of social networking sites may create associations with one another. The phrase "social networking site" as used herein encompasses its plain and ordinary meaning, including, but not limited to, an online service, platform and/or site that focuses on building and reflecting of social associations and interactions among users. These associations may be stored within a social graph at each social networking site. Such user associations may be defined on a user-to-user basis, or as a group of users associated through membership within a group. As used herein, "contacts" refer to other users that a user is associated with, at one or more social networking sites. As used herein, "contacts" refer to a user's friends, social circles, groups and other users that the user is associated with, at one or more remote social networking sites. Users can further assign their social networking contacts to groups and better control the distribution and visibility of social networking messages.

The subject disclosure provides a method for providing a multiple medium social networking experience using various internet-based and non-internet based communication mediums using various devices. The method provides for sending a message over a first communication medium (e.g., phone, SMS, MMS, e-mail or a social networking client application) for initiating a social networking operation which will be carried out at the social networking site. The message may be transmitted over the first communication medium in a format that is not supported by the social networking site (e.g., the social networking site software). The system receives the message and generates a message in a format that is compatible with the social networking site and provides the message to the social networking site for executing the operation at the social networking site. Thus, the system facilitates performing operations at a social networking site using messages sent over various communication media. Thus a user is able to carry out a social networking experience at a social networking site regardless of the capabilities of the user's client device (e.g., internet capability or browser capability) or communication mediums supported by the device the user is interacting with.

These operations may include any operations executable by a social networking client application (e.g., at a computer or mobile device having browser capabilities). The request to perform an operation at the social networking site may be transmitted over a communication medium other than a social networking client application (e.g., non-internet based communication media such as text messaging or phone services, or communication mediums that are more flexible with respect to web capability such as email). The user may send an operation request for performing an operation at the social networking site. The operation message may for example include predefined combinations of addresses (e.g., phone number, short code or email address) and operation strings (e.g., a text string). The operation request message may be received at the social networking site or an intermediary (e.g., server hosting the system) and may be converted into a message format compatible with the social networking site including a command (e.g., various API calls) executable by the social networking site to perform the operation.

The operations may include original operations initiated by a user by sending an operation message through a communication medium (e.g., adding friends, creating a post, creating a circle) or a response operation initiated as a response to a notification message received by the user through the communication medium (e.g., accepting/denying a friend request, commenting on a post). The notification message may include an indication of an operation performed at the social networking site (e.g., by another user), and may include an identifier of the operation performed at the social networking site, such that the user may respond to the operation.

With respect to original operations, the operation message may include a text or voice string including an operation identifier (e.g., ADD, DELETE, POST) and one or more parameters sent to an address (e.g., a phone number, short code or email address). A single address may be assigned to a social networking site. Alternatively, each specific address may act as a combination of the address and operation identifier and thus may be unique for a specific operation executable at a social networking site. The one or more parameters may include data or values for variables associated with an operation such as content for posting or distribution to one or more contacts at the social networking site, and/or may include the identification of one or more users associated with the operation. For example, where the operation is a post operation, the one or more parameters may include an indication of one or more intended recipients and may further include content for posting or distribution to the one or more intended recipients (e.g., contacts of the user at the social networking site). With regard to other operations such as ADD, or DELETE operations, the one or more parameters may include identification of users, contacts and/or groups for adding or deleting.

Upon receiving the operation message, the system identifies the address, operation identifier and one or more parameters, and further identifies a user identifier (e.g., using the phone number or email address from which the operation string is sent). The operation message may replace a specific URL associated with the social networking application or a specific page within the social networking application (e.g., user's profile). The operation message may be used to generate an API call which will cause the social networking site to perform an operation seamlessly, as if the operation was originated at a social networking application.

Similarly, a response operation (i.e. an operation in response to a notification) may be performed at the social networking application. In this instance, a notification received at a user device includes a specific ID which is used by the system as an indicator of one or more of an address, user identifier, one or more parameters associated with the operation (e.g., contact for which the user is approving a friend request) and/or the operation identifier (e.g., comment). Additionally the response operation message may include an operation string (e.g., a text string or voice command) including one or more parameters (e.g., a comment, YES, NO), or operation identifier. In one aspect, the notification provided to the user may provide the user with information pertaining to field entries (e.g., operation identifier or parameter(s)) that are necessary in the operation string for performing a response operation with respect to the notification. The response operation message is received and converted to a format compatible with the social networking site to perform an operation at the social networking site.

While the response operation is described as being performed in response to receiving a notification, the user may perform an operation associated with another operation performed at the social networking site by sending a message over any communication medium without the need for the notification. The user may for example, identify an existing operation such as a post, friend request, and/or conversation at the social networking site and may perform an operation in relation to the identification existing operation using the identifier (e.g., conversation ID or operation ID).

Accordingly, various social networking operations performable by the social networking application may be originated from any communication medium, including non-internet based and other communication mediums which do not necessarily require full internet or browsing capability and/or use of the social networking application associated with the social networking site.

FIG. 1 illustrates an example client-server network environment which provides for a multiple medium social networking experience. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in facilitating a multiple medium social networking experience between users operating electronic devices 102, 104 and 106.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

In some example embodiments, electronic devices 102, 104 and 106 can be computing devices such as laptop or desktop computers, smartphones, PDAs, portable media players, tablet computers, or other appropriate computing devices that can be used to for group conversation within a social network. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). Furthermore, network 108 can be a public communication network (e.g., the Internet, cellular data network, dialup modems over a telephone network) or a private communications network (e.g., private LAN, leased lines). In one example the present system and/or social networking site may be hosted at the server 110 or may be hosted separately at one or more servers communicatively coupled to one another (e.g., through network 108 or another network connection). The operations described with respect to the system may be performed by the social networking site or may be an independent system in communication with the social networking site (e.g., through network 108 or another network connection).

A user operating a client device (e.g., electronic devices 102, 104 or 106) may create and send a message including a text string or voice command over a communication medium to the system (e.g., hosted at server 110). In one example, the message may be forwarded using a unique address associated with the social networking site and/or the system. The message may further include a parameter string including values for parameters such as content and/or contacts associated with the operation. The message may also include an operation ID identifying the operation to be executed according to the one or more parameters. Furthermore, if the operation is in response to an operation performed at the social networking site or an ongoing post or conversation, the message may include an identifier identifying the associated operation at the social networking site (e.g., provided by a notification to the user). The data set including one or more of the above is received at the system. The system, upon receiving the message may identify the user sending the message, the operation and the one or more parameters and generates one or more calls (e.g., API calls) to the social networking site for performing the operation according to the one or more parameters on behalf of the sender.

In one example, the system may identify the client device and confirm that the device is an authorized device for the purpose of performing operations on the social networking sites on behalf of the user sending the message. For example, users may register their client device at the social networking site and/or system and may be authenticated. Thus, when the message is received, the system may determine that the user is authenticated (e.g., based on device identification or by receiving a special code or password) and may perform the operation when it is determined that the user is authenticated.

Figure 2:
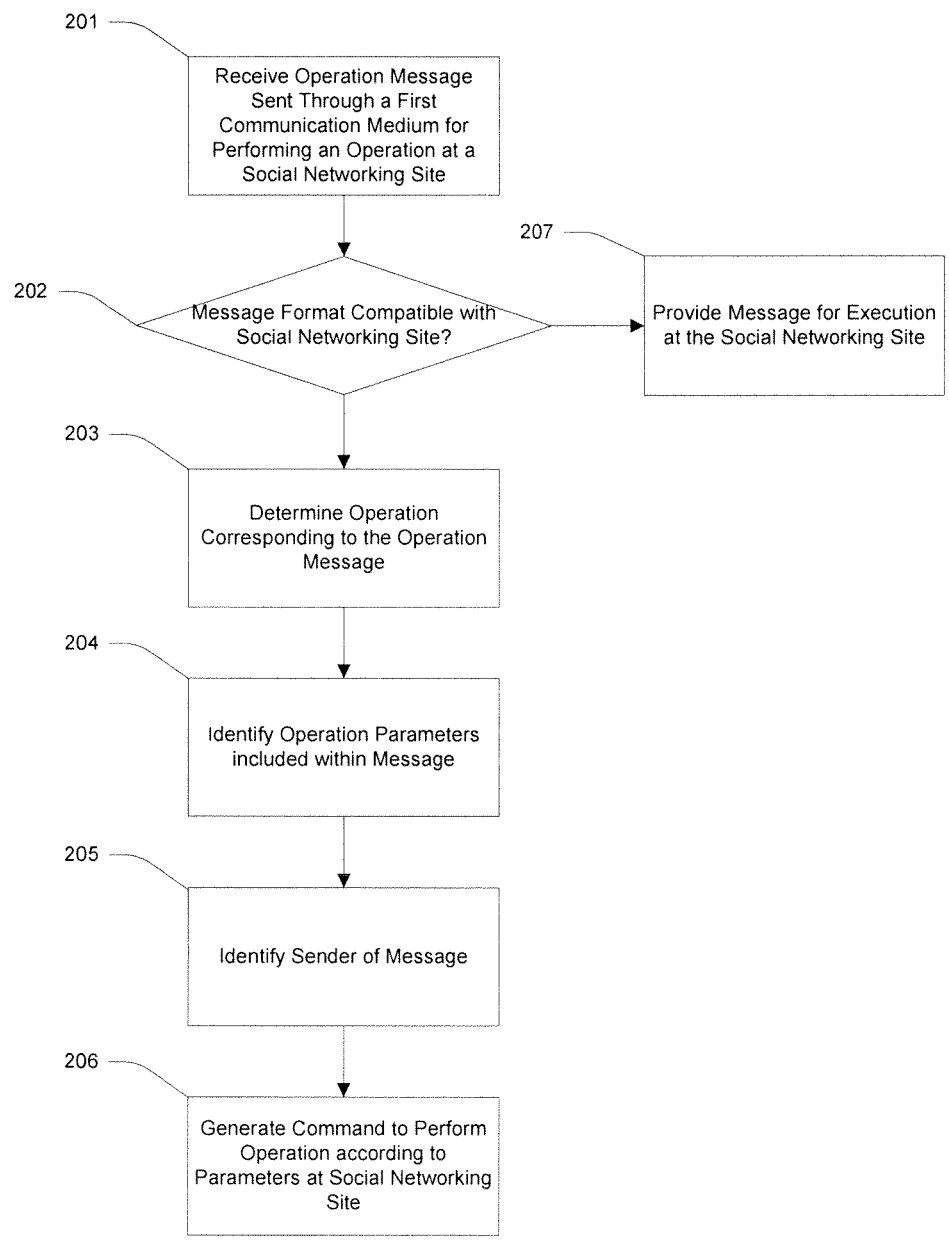
FIG. 2 illustrates an example process for performing a social networking operation according to a message sent from a client device.

FIG. 2 illustrates an example process 200 for performing a social networking operation according to a message sent from a client device. The message may be transmitted using any communication medium (e.g., a text message, an email, a phone message). The message may include a message for performing an operation or responding to an operation performed at the social networking site.

In step 201, the system receives a message sent through a first communication medium for performing an operation at a social networking site. For example, the message may include a text message, a voice message, an email or other text or voice command sent to a specific address. The address may be unique to the social networking site where the user wishes to perform the operation. Additionally, the address may be unique to the operation to be executed at the social networking site. The message may include one or more of an operation code or other identifier (e.g., a text or voice keyword) and a parameter string (including one or more of contacts and/or contact relating to the operation).

The message may also include an identifier identifying an existing operation (e.g., friend request, post) at the social networking site associated with the operation requested through the message (e.g., where the message is a response operation message). For example, the message may include a request to post content at a social networking site and may include an indication of the post operation, and one or more parameters including at least the content to be posted and/or the contacts that the user wishes the content to be posted or visible to. Similarly, the operation may be to add or delete a contact or group associated with the user at the social networking site, where the one or more parameters include an identifier of the contact(s) and or group(s).

The message may be sent in response to the user receiving an indication of an operation performed at the social networking site (e.g., in response to a notification received by the user) and may include an operation ID (or conversation ID) associating the message with a specific operation at the social networking site. For example, the user may request to post a response to a post (e.g., comment), may request to accept or deny a contact request, or may otherwise request to reply to an operation performed at the social networking site (e.g., by another user of the social networking site).

In one example, the system may (e.g., upon request by the user or as part of a notification sent to the user's client device) provide the user with an instruction message including the operation codes and/or parameters necessary for performing a specific operation at the social networking site. The system may further provide the user with a listing of the user's contacts, groups or available operations. Upon receiving the instructions and information, the user may create a message including a request perform an operation. The message may formatted according to the specific communication medium used to transmit the message (e.g., according to the communication protocol used by the communication medium) and may be transmitted to the address provided by the user.

In step 202, the system determines whether the communication medium that the message is sent from is compatible with the social networking site. The message format used by the communication medium may not be supported at the social networking site (e.g., message is sent through a communication medium other than the social networking application). If in step 202 it is determined that the message is sent through a communication medium using a format compatible with the social networking site (e.g., through a social networking client application), in step 207, the message may be forwarded to the social networking site. Alternatively, upon determining that the communication medium is not compatible with the social networking site, the process may proceed to step 203.

In step 203, the system determines the operation to be performed at the social networking site based on the operation message. Thus, the system may parse the message and extract the content of the message, including the desired operation and parameters associated with the operation, and may generate a new message compatible with the social networking site. In one example, the operation is identified based on the operation code within the message. The system may parse the message (e.g., text or voice string) and may determine the operation code. The operation code may comprise a predefined keyword and may be provided within a specific position such that it is identifiable by the system. Alternatively, the specific address used to transmit the message may be mapped to a specific operation.

In step 204, the system identifies the operation parameters corresponding to the operation including one or more of content and/or an indication of contacts or groups. The content may include text, and links to various content (e.g., video clips, articles, web sites, audio clips), and/or embedded multi-media content The message may further include an operation identifier indicating the message corresponds to a content intended to be shared with each of the intended recipients.

In step 205, the system identifies the sender of the message. The message may include an indication of the sender of the message (e.g., a phone number or email address) identifying the user to the system. For example, the user may register each device or address (e.g., phone number or email address) at the system and/or social networking site. The system may identify the address or device from which the message is sent and may determine the user associated with the message. The system may use the sender identification to authenticate the user at the social networking site. The system may further authenticate the device the message is sent from using the sender identification.

Finally, in step 206, the system generates a command executable at the social networking site (e.g., one or more API calls) for performing the operation in accordance with the parameters on behalf of the identified user. The social networking site may then receive the one or more commands (e.g., API calls) and perform the operation similar to the operation being performed at a social networking client application associated with the social networking site.

Figure 3:
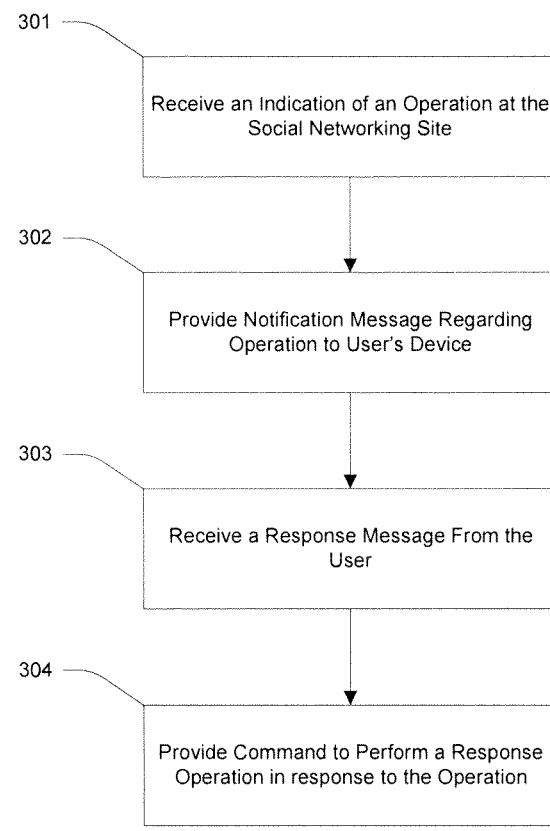
FIG. 3 illustrates a flow chart of an example process for providing a notification of an operation to a user and receiving a response operation from a user.

FIG. 3 illustrates a flow chart of an example process 300 for providing a notification of an operation to a user and receiving a response operation from a user. In step 301, the system receives an indication of an operation occurring at a social networking site. The operation may be performed by a user according to process 200 above. In step 302, the system provides a notification message to the client device of the user. The notification message may be sent to the user according to the user's preferred communication medium. For example, the notification message may be sent as a text message, notifying the user of an operation performed (e.g., by a contact of the user or another user) with regard to the user at the social networking site. The notification may include an operation identifier. The notification may further include instructions for the user to respond to the operation at the social networking site (e.g., accept a friend request, comment on a post).

In step 303, the system may receive a response message from the user. The response message may for example be sent when the user responds to the notification sent to the user's client device. In one example, the notification message may include a special address (e.g., phone number, email address or short code) and the response message may be sent to the address. Alternatively, the user may simply respond to the message using a link within the notification or otherwise by responding to the number. The response message may include a one or more parameters (e.g., a comment, YES, NO). The message may further include information for identifying the operation associated with the response (e.g., using the address or an operation ID appended to the message in response to the user responding to the notification). The system may receive the message and perform the operations according to process 200 described above. For example, the system first determines if the message is in a format that is supported by the social networking site. If it is determined that the message is not in a compatible format, the system identifies the operation associated with the response (e.g., according to the operation identifier) and further determines the one or more parameters included within the message. The system may then identify the type of operation that should be performed at the social networking site with respect to the one or more parameters. Alternatively, the message may include an operation code (e.g., a keyword).

In step 304, the system generates a command (e.g., an API call) to the social networking site to perform the operation corresponding to the user's response message in response to the operation detected in step 301.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
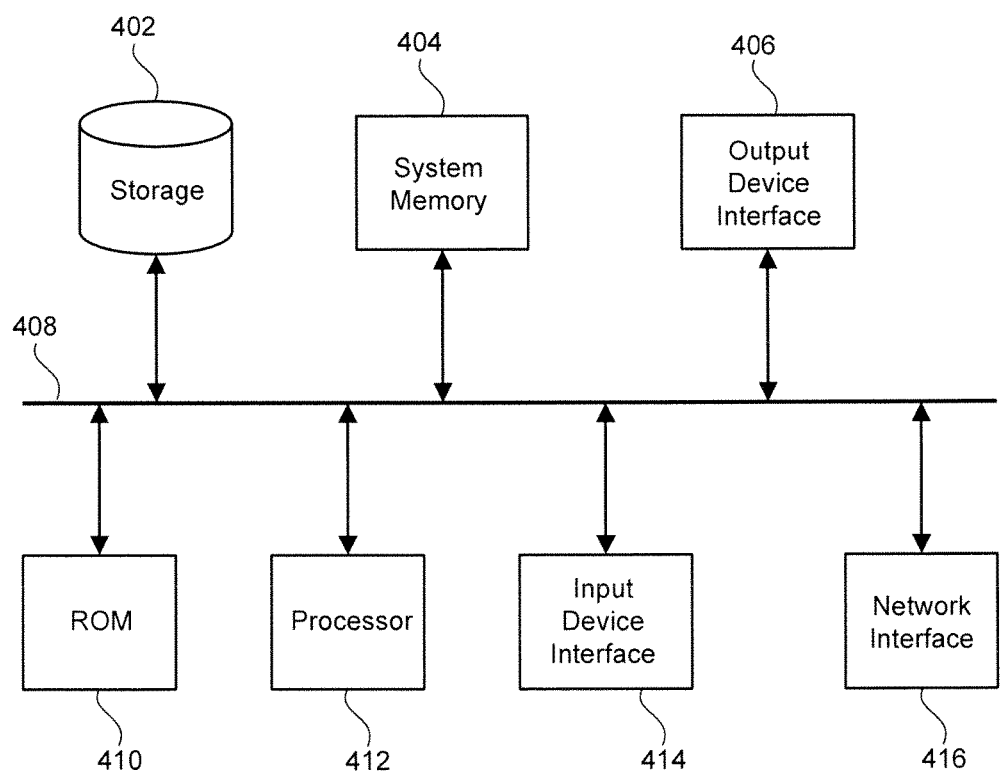
FIG. 4 conceptually illustrates an electronic system with which some implementations of the subject technology are implemented.

FIG. 4 conceptually illustrates an electronic system with which some implementations of the subject technology are implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for processing multimedia items in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touch-screen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for providing a multiple medium social networking experience, the method comprising:
   receiving an indication of a first operation at the social networking site associated with a user;
   providing a notification in response to receiving the indication to be sent to the user through a communication medium;
   receiving, in response to providing the notification, a first message from the user through the communication medium to perform a second operation in response to the first operation at a social networking site, the social networking site being configured to perform multiple types of operations, the first message comprising a keyword for selecting one of the multiple types of operations to perform at the social networking site;
   determining if a format, of the first message, used by the communication medium is compatible with the social networking site; and
   in response to determining that the format used by the communication medium is not compatible with the social networking site:
      extracting the keyword from a predefined position within the first message;
      identifying the second operation based on the one type of operation selected by the extracted keyword; and
      generating a second message in a format supported by the social networking site, the second message including a command executable by the social networking site to perform the second operation at the social networking site on behalf of the user.

2. The method of claim 1, further comprising:
   forwarding the first message for execution at the social networking site in response to determining that the format, of the first message, used by the communication medium is compatible with the social networking site.

3. The method of claim 1, wherein the first message comprises an identifier of the second operation and one or more parameters associated with the second operation.

4. The method of claim 3, wherein the one or more parameters comprises a value associated with the second operation, and wherein the generating the command comprises a request to perform the second operation according to the one or more parameters.

5. The method of claim 3, wherein the one or more parameters include a text string or voice command corresponding to one of a post, a response to a post, or a response to an operation at the social networking site.

6. The method of claim 1, wherein the first message comprises a command string which includes the keyword indicating the one type of operation.

7. The method of claim 1, wherein the multiple types of operations comprise at least two of adding a social contact within the social networking site, deleting a social contact within the social networking site, creating a preset group of contacts within the social networking site, posting a message to the social networking site, accepting a request to add a new social contact or denying a request to add a new social contact.

8. The method of claim 1, wherein the second operation is mapped to a specific address, and wherein identifying the second operation comprises determining the address to which the first message is sent and identifying the second operation based on the determined address.

9. The method of claim 1, wherein the communication medium is one of a text messaging service, a phone service or an email service.

10. The method of claim 1, further comprising:
    identifying a device the first message is received from; and
    identifying the user based on the identified device.

11. The method of claim 1, wherein the format, of the first message, used by the communication medium is compatible with the social networking site if the communication medium is able to recognize and perform the second operation.

12. A system providing a multiple medium social networking experience, the system comprising:
    one or more processors; and
    a machine-readable medium comprising instructions stored therein, which when executed by the processors, cause the processors to perform operations comprising:
       receiving an indication of a first operation at the social networking site associated with a user;
       providing a notification in response to receiving the indication to be sent to the user through a communication medium;
       receiving, in response to providing the notification, a first message from the user through the communication medium to perform a second operation in response to the first operation at a social networking site, the social networking site being configured to perform multiple types of operations, the first message comprising a keyword for selecting one of the multiple types of operations to perform at the social networking site and further comprising one or more parameters;
       determining whether the first message is in a format that is supported by the social networking site; and
       in response to determining that the first message is not in a format supported by the social networking site:
          extracting the keyword from a predefined position within the first message;
          identifying the second operation based on the one type of operation selected by the extracted keyword; and
          generating a second message, the second message including a command executable by the social networking site to perform the second operation according to the one or more parameters at the social networking site on behalf of a user initiating the first message.

13. The system of claim 12, wherein providing a notification to the user comprises determining the communication medium as a preferred communication medium for the user and generating the notification according to a format supported by the communication medium.

14. The system of claim 12, wherein the one or more parameters comprises values of one or more parameters associated with the second operation.

15. A machine-readable medium comprising instructions stored therein, which when executed by a machine, cause the machine to perform operations comprising:
receiving an indication of a first operation at the social networking site associated with a user;
providing a notification in response to receiving the indication to be sent to the user through a communication medium;
receiving, in response to providing the notification, a first message from the user through the communication medium to perform a second operation in response to the first operation at a social networking site, the social networking site being configured to perform multiple types of operations, the first message comprising a keyword for selecting one of the multiple types of operations to perform at the social networking site and further comprising an identifier of a user initiating the first message;
in response to determining that the communication medium is not compatible with the social networking site:
extracting the keyword from a predefined position within the first message;
identifying the second operation based on the one type of operation selected by the extracted keyword;
identifying one or more parameters associated with the second operation;
generating a second message including a command executable by the social networking site to perform the second operation at the social networking site on behalf of the user initiating the first message; and
providing the command for execution at the social networking site.

16. A machine-implemented method for providing a multiple medium social networking experience to a user, the method comprising:
receiving an indication of a first operation at the social networking site associated with a user;
providing a notification in response to receiving the indication to be sent to the user through a communication medium;
receiving, in response to providing the notification, a first message from the user through the communication medium to perform a second operation in response to the first operation at a social networking site, the social networking site being configured to perform multiple types of operations, the first message comprising a keyword for selecting one of the multiple types of operations to perform at the social networking site and further comprising one or more parameters providing one or more data value regarding the second operation, wherein the first message is received through a communication medium using a different message format than that used for directly sending messages to the social networking site;
extracting the keyword from a predefined position within the first message;
identifying the second operation based on the one type of operation selected by the extracted keyword; and
generating a second message in a format supported by the social networking site, the second message including an API call corresponding to the second operation executable by the social networking site to perform the second operation according to the one or more parameters at the social networking site on behalf of the user.

17. The method of claim 1, further comprising sending the second message to the social networking site for execution.

18. The method of claim 3, further comprising:
transmitting, prior to the receiving, an instruction message to the user, the instruction message comprising instructions for the user to specify the identifier of the second operation and the one or more parameters associated with the second operation.

19. The method of claim 1, further comprising:
receiving a third message from the user through the communication medium to perform a third operation at the social networking site, the third message comprising a second keyword for selecting a second type of the multiple types of operations to perform at the social networking site;
extracting the second keyword from a second predefined position within the third message;
identifying the third operation based on the second type of operation selected by the extracted keyword; and
generating a fourth message in the format supported by the social networking site, the fourth message including a second command executable by the social networking site to perform the second operation at the social networking site on behalf of the user.

* * * * *